Patented June 19, 1934

1,963,269

UNITED STATES PATENT OFFICE 1,963,269

METHOD OF DESULPHURIZING AND PURIFYING IRON

Charles T. Hennig, Cleveland, Ohio

No Drawing. Application July 12, 1924, Serial No. 725,693

1 Claim. (Cl. 75—27)

This invention relates to the manufacture of iron castings and more particularly to desulphurizing and purifying iron in the cupola and the ladle.

One of the objects of the invention is to provide a comparatively cheap, reliable and efficient method of desulphurizing and purifying iron that will overcome the objectionable features of methods heretofore used and produce better castings.

A further object of the invention is to provide an improved method of desulphurizing in a cupola, that will involve the formation of a slag of high fluidity through which the molten pellets of iron will readily pass and thereby avoid objectionable oxidation and liability to re-sulphurization.

A further object of the invention is to provide an improved method of desulphurizing iron, in a cupola, that will largely avoid the rapid destruction of the cupola lining, that is inherent in methods heretofore used, and leave the cupola comparatively free from slag accumulations so that the work of preparing the cupola for the succeeding melt will be reduced to a minimum.

In the process of desulphurizing molten iron the desulphurizing effect of the slag is proportional not only to its basicity but, in an almost equal degree, to its fluidity, and it is, therefore, one of the objects of this invention to take full advantage of this fact by the employment of a slag forming material that will produce a very liquid slag at the lower range of temperatures at which iron is handled in the molten condition.

Fluorspar ($CaF_2$) has been used as a flux to liquefy the slag and to absorb sulphur, as calcium sulfid ($CaS$), but the formation of calcium sulfid requires a very high heat to produce a stable compound, a heat much higher than the working temperature range of molten iron and the calcium sulfid formed at the working temperature in a cupola is unstable and decomposes and the sulphur then goes back into the metal on account of the greater affinity of sulphur for iron than for calcium. Fluorspar has the further disadvantage that it corrodes the furnace and ladle linings and, if used in a bottom-pouring ladle, is dangerous due to its corrosive action on the stopper rod thereby causing leaks and occasionally the loss of a heat from the ladle.

Barium carbonate has been used as a slag-forming material but it is not satisfactory because the barium has a greater affinity for silicon than for sulphur and, therefore, changes the silicon content of the iron by forming barium silicate which makes the slag very thick and viscous and very heavy so that it has a tendency to sink into the metal.

Heretofore it has been customary to use lime as the principal desulphurizing material for molten iron but lime has the disadvantage of forming a viscous or pasty slag so that, in treating molten iron, the desulphurizing influence of increased lime is counteracted by its viscosity which renders the slag less active as a purifying agent and may even result in resulphurizing the iron due to the greater affinity of sulphur for iron than for calcium at the relatively low temperatures at which the iron melts. Moreover calcium has greater affinity for silicon than for sulphur and, as a result, the lime will first form calcium silicate before forming calcium sulfid and thus reduce the amount of calcium available to remove sulphur.

It has been proposed to use sodium borate (borax) and boracic acid as flux-forming materials but, while it has been found that these have a strong affinity for the metallic oxides and hold them in solution in the slag, they are of little value as desulphurizers and consequently have not gone into commercial use. Potassium salts, cyanides, cyanamides, sodium nitrate, and magnesium salts, as well as sodium chloride, have been proposed but these have proved impracticable because, in many cases dangerous, and because they usually introduce complications that are as bad or worse than the sulfur. This is particularly true of the chlorides and nitrates.

In carrying out my invention I employ sodium carbonate as the desulphurizer and purifier. It melts at the relatively low temperature of 858° C., which is below the melting point of iron, and has a low specific gravity and high fluidity which qualities prevent it from being enmeshed in the metal and enable it to rise readily to the top and carry impurities with it, thereby removing them from the molten metal. Sodium carbonate has the further advantage of freely giving up carbon dioxide in the temperature range of molten iron and this causes boiling of the molten metal, bringing impurities and injurious gases to the top. The $CO_2$ is not injurious to the metal because it is practically an inert gas in the temperature range of molten iron.

The sodium carbonate does not start to decompose until it reaches the approximate temperature at which iron melts and when decomposition occurs the sodium probably exists for a very brief interval in the nascent state and then, owing to its great affinity for sulphur, it forms sodium sulfides which are stable compounds and rise to the surface, thereby desulphurizing the metal. So long as there is sodium present and sulphur available in the metal, the greater affinity of the sodium for sulphur than for silicon and phosphorus results in the silicon and phosphorus being left in the metal practically undisturbed.

An advantage of sodium carbonate over lime and other fluxes, now used, is that, because of its fluidity and ability to readily separate from the metal and rise to the surface and thereby carry with it impurities, such as oxides, which are known to make the metal more sluggish, it thereby makes the metal more fluid, thus giving the occluded gases better opportunity to escape. This results in less blow-holes in the finished casting and permits the use, in the melting stock, of more scrap metal and a cheaper iron having a relatively high sulphur content, without detrimentally affecting the quality of the finished material, and thus cheapens the cost.

In the practice of my invention in connection with a cupola for melting cast iron, I have found that, in the case of an iron charge averaging 0.085% of sulphur, the use of seven pounds of sodium carbonate per ton of iron, with a good foundry coke, will reduce the sulfur in the iron to approximately 0.060%, or, in other words, will effect the removal of an average of 0.0035% of sulphur from the iron per pound of sodium carbonate and, in addition, will also remove the sulphur introduced by the coke. For the sake of economy it is desirable to use the cheaper low grade sodium carbonate or soda ash produced by alkali plants. This is usually prepared for use in my process by fritting or by briquetting, by pressure (no binder required) or by fusing and running into molds, or by mixing with from 21% to 31% of water in any suitable mixer, from which it is poured into molds where it quickly solidifies and becomes very hard. The cakes are then broken up into lumps preferably about the size of walnuts.

In charging the cupola, the usual practice of first putting in a bed of coke, is followed and, in a case where this initial charge of coke would be about four hundred pounds, approximately four pounds of the sodium carbonate lumps should be distributed over the top of the coke bed. As the iron is charged, according to the usual practice, additional sodium carbonate is thrown in on each charge of iron, in the proportion of from five pounds to ten pounds per ton of iron, the exact proportion depending upon the sulphur content of the coke and the iron, that are charged, and the amount of sulphur that it is desired to have in the castings.

Toward the end of the melting period the proportion of iron to coke, in the cupola, is relatively low and therefore the iron tends to take up a larger percentage of the sulphur from the coke and, to counteract this tendency, it is usually desirable to increase the proportion of sodium carbonate in the last two charges about 50%.

While I prefer to introduce the sodium carbonate into the cupola in the manner described it is also feasible to introduce it in the powdered form with the blast and, under some conditions, this manner of introducing the sodium carbonate may be desirable.

While it is preferable to charge the sodium carbonate into the cupola because it then has a longer time to react with the sulphur, conditions sometimes arise where the iron appears sluggish as it comes out of the spout of the cupola and it is desirable to desulphurize and purify in the ladle. Under these conditions the sodium carbonate may be either put in the bottom of the ladle before the iron is run in, or, preferably, the sodium carbonate is thrown in when the ladle is about one quarter full of iron. The sodium carbonate is thus churned up with the metal and gives off $CO_2$ which causes the metal to boil and carry the impurities to the top and also brings the sodium into intimate relation with all parts of the molten mass permitting the sulphur to combine with the sodium and form a sodium sulfid slag which, owing to its low specific gravity and high fluidity, is readily forced to the surface. From five to ten minutes should be allowed for this reaction. The sulfur content of the iron is thus reduced, the fluidity raised by the elimination of the iron oxides and this gives the occluded gases a change to escape. On account of the slag thus formed being very liquid it is usually advisable to make it more viscous so that it may be skimmed off and also to prevent it from running into the mold with the iron. This may be done by adding finely divided lime or other relatively infusable material or by blowing a fine spray or film of water over the surface of the slag, or both. When a spray of water is used it decomposes the sodium sulfid in the slag, the sulphur passing off as $SO_2$, in gaseous form, which permits the slag to take up more sulphur from the iron.

As before stated, the carbonate of soda produces a very liquid slag in the temperature range of molten iron and, on account of being put into the cupola with the charges, it melts before the iron melts and trickles down over the coke and iron, giving off $CO_2$ and taking up sulphur from the coke. It is also probable that the molten sodium carbonate forms a film over the globules of iron as they are formed in the melting zone of the cupola and this film protects the surface of the globules from oxidation. On account of the slag which floats on the bath of iron, at the bottom of the cupola, being very liquid, the globules of iron pass through it quickly and are, therefore, subjected to the action of the blast, through the slag, for only a very brief interval and this tends to prevent the formation of oxides which, if formed, would be carried by the globules into the bath of iron.

The method of desulphurizing and purifying iron, which I have above described, is comparatively cheap because only a relatively small quantity of the sodium carbonate is required, and it is reliable because it does not disturb the silicon and phosphorus content of the iron and by properly proportioning the amount of sodium carbonate the amount of sulphur removed from the iron may be closely regulated. This method is also efficient because sodium carbonate melts at a lower temperature than the iron and, at the temperature of molten iron, is very liquid and highly reactive, forming, with the sulphur, compounds which are stable and avoid the possibility of resulphurizing the iron from the slag.

The slag formed according to the method herein described will not react upon the cupola lining and, on account of being very liquid, it has little or no tendency to accumulate on the lining and, being molten below the temperature at which iron melts, the slag will drop out of the cupola, at the end of the melt, and leave the interior of the cupola practically clean so that it may be quickly prepared for the succeeding melt.

From the foregoing it will be understood that, in practicing my invention, I form a slag that is substantially neutral to the silicon and phosphorus in the iron so long as there is sulphur in the iron available for combination with the slag and that the sulphur is removed by being combined with the sodium and forming sodium sulfides which are stable compounds in the temperature range of molten iron and, therefore, will not decompose in the cupola and resulphurize the iron. When the process is used for treating the iron in the ladle the sodium sulfides at the surface of the slag may be decomposed, as herein described, by blowing a fine spray or film of water over the slag which will set the sulphur free and permit it to pass off in gaseous form as sulphur dioxide, and this restores the sodium to a condition in which it may further react with the sulphur in the iron to form more of the sodium sulfides.

While I prefer to use sodium carbonate, on account of its low cost and being always available in the market, because of its being manufactured in enormous quantities, it is possible to use, in some instances, sodium bicarbonate, potassium carbonate, magnesium carbonate and other carbonates of the alkali metals but these are usually more expensive than sodium carbonate and many of them introduce detrimental conditions that may be avoided by the use of sodium carbonate.

Having thus described my invention, what I claim is:

The herein described method of desulphurizing and purifying iron which consists in treating the iron with a sodium carbonate containing slag that is substantially neutral to the silicon and phosphorus in the iron so long as there is sulphur in the iron available for combination with the slag and removing the iron oxides from the iron by the boiling action of the carbon dioxide passing therethrough, removing the sulphur from the iron by reaction with the sodium to form sulfides, and treating the surface of the slag with water to decompose the sodium sulfides therein and thereby release sodium for reaction with more of the sulphur in the iron and causing the sulphur released from the sulfides to pass off as sulphur dioxide.

CHARLES T. HENNIG.